US012699437B2

(12) United States Patent
Dasgupta et al.

(10) Patent No.: US 12,699,437 B2
(45) Date of Patent: Aug. 4, 2026

(54) ENERGY-AWARE APPLICATION MIGRATION RECOMMENDATION

(71) Applicant: International Business Machines Corporation, Armonk, NY (US)

(72) Inventors: Diptiman Dasgupta, Kolkata (IN); Jignesh Karia, Thane (IN); Charbak Roy, Kolkata (IN); Sudip Dutta, Kolkata (IN); Prasad Kurup, Mumbai (IN)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 18/370,591

(22) Filed: Sep. 20, 2023

(65) Prior Publication Data

US 2025/0093940 A1     Mar. 20, 2025

(51) Int. Cl.
*G06F 1/32*          (2019.01)
*G06F 1/329*         (2019.01)
(52) U.S. Cl.
CPC .................................. *G06F 1/329* (2013.01)
(58) Field of Classification Search
CPC ....................................................... G06F 1/329
See application file for complete search history.

(56) References Cited

U.S. PATENT DOCUMENTS 6,912,664 B2 * 6/2005 Ranganathan ........ G06F 3/1431
                                                345/98
9,207,993 B2  12/2015 Jain 11,237,941 B2  2/2022 Velammal et al.
11,354,120 B1  6/2022 Zhang et al.
11,445,040 B2  9/2022 Sharma et al.

(Continued)

OTHER PUBLICATIONS

Ahvar, E., et al., "DECA: A Dynamic Energy Cost and Carbon Emission-Efficient Application Placement Method for Edge Clouds", IEEE Access, accepted Apr. 7, 2021, date of publication Apr. 27, 2021, date of current version May 18, 2021, pp. 70192-70213, vol. 9.

(Continued)

*Primary Examiner* — Jaweed A Abbaszadeh
*Assistant Examiner* — Cheri L Harrington
(74) *Attorney, Agent, or Firm* — Scully, Scott, Murphy & Presser, P.C.; Gavin Giraud

(57)          ABSTRACT

Application migration recommendation based on energy consumption includes receiving time series data of application energy consumption and application usage metrics associated with an application being considered for migration in a computing environment. Energy aware design catalog having a list of design patterns for migration and associated design detection functions is provided. For each of the design patterns listed in the energy aware design catalog, a design detection function associated with a design pattern is run using the time series data of application energy consumption and application usage metrics, where the design detection function outputs whether the application is suitable for transformation using the design pattern and projected energy savings if the transformation is implemented using the design pattern. A design pattern estimated to have largest projected energy savings is returned as recommended migration for the application.

14 Claims, 6 Drawing Sheets

(56)          References Cited

U.S. PATENT DOCUMENTS

| | | | | |
|---|---|---|---|---|
| 2010/0180275 A1* | 7/2010 | Neogi | .................... | G06F 1/3203 |
| | | | | 718/1 |
| 2011/0289329 A1* | 11/2011 | Bose | ....................... | G06F 1/329 |
| | | | | 713/320 |
| 2013/0046967 A1* | 2/2013 | Fullerton | ............... | H03K 5/133 |
| | | | | 713/100 |
| 2015/0052372 A1* | 2/2015 | Barde | ..................... | G06F 1/329 |
| | | | | 713/320 |
| 2022/0261059 A1* | 8/2022 | Bobovych | ............... | G06F 1/329 |
| 2022/0398095 A1* | 12/2022 | Weldemariam | ........... | G06F 8/76 |
| 2023/0048137 A1* | 2/2023 | Jain | .................... | G06F 11/3428 |
| 2023/0385697 A1* | 11/2023 | Kommula | ................. | G06F 1/26 |

OTHER PUBLICATIONS

Vaneet, G., "Energy efficient virtual machine migration approach with SLA conservation in cloud computing", J. Cent. South Univ. (2021), Accepted date Oct. 18, 2020, pp. 760-770, 28.
Zheng, Y., et al., "Energy Savings When Migrating Workloads to the Cloud", arXiv:2208.06976v1 [cs.DC], Aug. 15, 2022, 5 pages.

* cited by examiner

ENERGY-AWARE APPLICATION MIGRATION RECOMMENDATION

BACKGROUND

The present application relates generally to computers and computer applications, and more particularly to application migration recommendation based on energy consumption.

BRIEF SUMMARY

The summary of the disclosure is given to aid understanding of a computer system and method of application migration recommendation, for example, based on energy consumption, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

In some embodiments, a computer-implemented method includes receiving time series data of application energy consumption and application usage metrics associated with an application being considered for migration in a computing environment. The method also includes providing an energy aware design catalog having a list of design patterns for migration and associated design detection functions. The method also includes, for each of the design patterns listed in the energy aware design catalog, running a design detection function associated with a design pattern using the time series data of application energy consumption and application usage metrics, where the design detection function outputs whether the application is suitable for transformation using the design pattern and projected energy savings if the transformation is implemented using the design pattern. The method also includes returning a design pattern estimated to have largest projected energy savings as recommended migration for the application.

In some embodiments, a system includes at least one computer processor. The system also includes at least one memory device coupled with the at least one computer processor. The at least one computer processor is configured to receive time series data of application energy consumption and application usage metrics associated with an application being considered for migration in a computing environment. The at least one computer processor is also configured to provide an energy aware design catalog having a list of design patterns for migration and associated design detection functions. The at least one computer processor is also configured to, for each of the design patterns listed in the energy aware design catalog, run a design detection function associated with a design pattern using the time series data of application energy consumption and application usage metrics, where the design detection function outputs whether the application is suitable for transformation using the design pattern and projected energy savings if the transformation is implemented using the design pattern. The at least one computer processor is also configured to return a design pattern estimated to have largest projected energy savings as recommended migration for the application.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
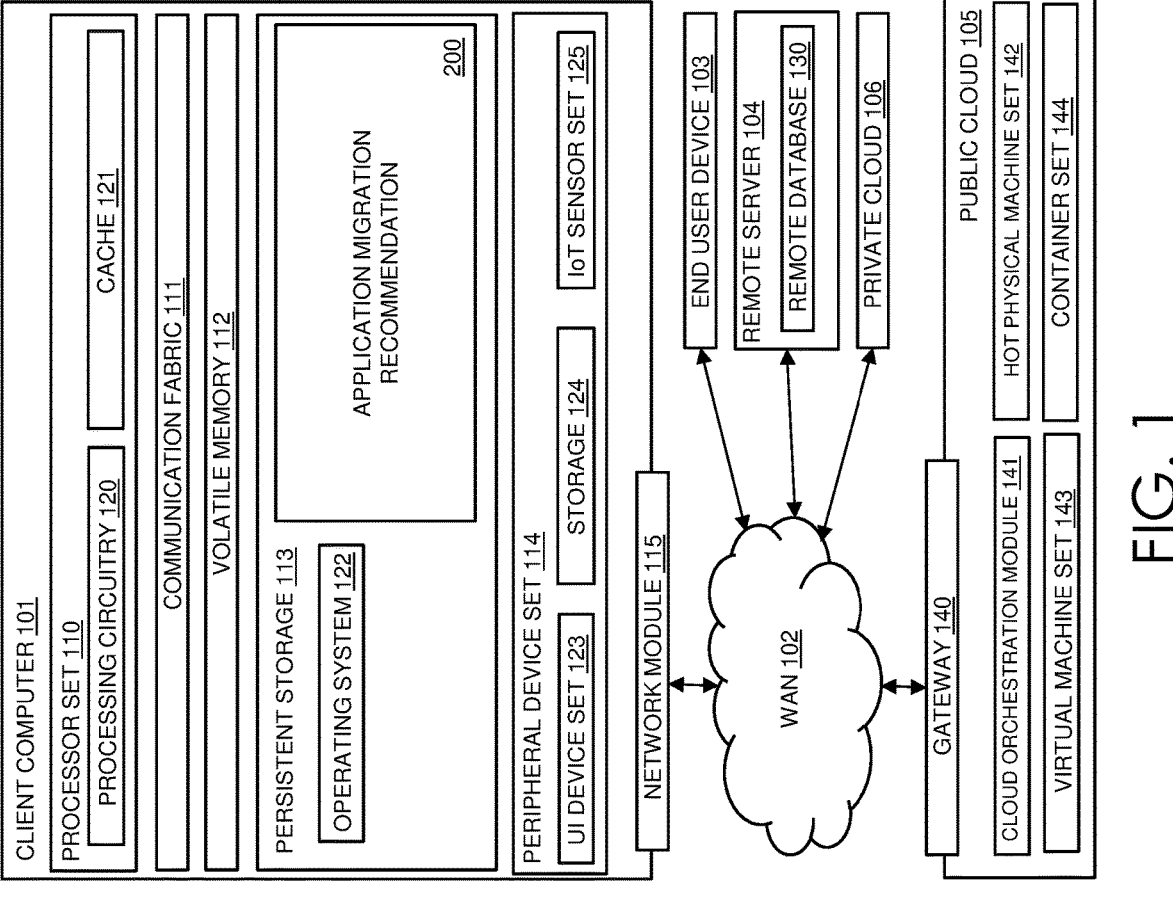
FIG. 1 shows an example of a computing environment, which can implement application migration recommendation in an embodiment.

In some embodiments, a computer-implemented method includes receiving time series data of application energy consumption and application usage metrics associated with an application being considered for migration in a computing environment. The method also includes providing an energy aware design catalog having a list of design patterns for migration and associated design detection functions. The method also includes, for each of the design patterns listed in the energy aware design catalog, running a design detection function associated with a design pattern using the time series data of application energy consumption and application usage metrics, where the design detection function outputs whether the application is suitable for transformation using the design pattern and projected energy savings if the transformation is implemented using the design pattern. The method also includes returning a design pattern estimated to have largest projected energy savings as recommended migration for the application.

In this way, for example, a migration pattern that consumes the least energy or provide the least carbon footprint based on an application's characteristics can be provided.

One or more of the following features can be separable or optional from each other. In some embodiments, the design patterns include at least an application programming interface (API)-to-cloud function design pattern for transforming the application from an API to a function in a cloud computing environment. Having a design pattern and associated design detection function for API-to-cloud function allows for an option of recommending such a pattern for an application having application characteristics suitable for such migration or transformation.

In some embodiments, the design patterns include at least a monolithic-to-microservice design pattern for transforming the application to a microservice. Having a design pattern and associated design detection function for monolithic-to-microservice architecture allows for an option of recommending such a pattern for an application having application characteristics suitable for such migration or transformation.

In some embodiments, the application usage metrics includes at least a central processing unit (CPU) utilization of the application. In this way for example, energy consumption and/or carbon footprint of an application can be measured based on CPU utilization.

In some embodiments, the application usage metrics includes at least a number of API calls performed in the application. In this way for example, energy consumption savings and/or carbon footprint savings of an application can be measured based on the number of API calls an application performs.

In some embodiments, the application usage metrics includes at least a number of database transactions performed in the application. In this way for example, energy consumption savings and/or carbon footprint savings of an application can be measured based on the number of database transactions an application performs.

In some embodiments, the computer-implemented method can also include providing a visual representation of an application load and energy consumption with potential energy savings. A user interface with visual graphics may provide for easier understanding of an application's energy consumption and/or carbon footprint levels.

A system including at least one computer processor and at least one memory device coupled with the at least one computer processor is also disclosed, where the at least one computer processor is configured to perform one or more methods described above. A computer program product is also disclosed that includes a computer readable storage medium having program instructions embodied therewith, where the program instructions are readable by a device to cause the device to perform one or more methods described above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as application migration recommendation algorithm code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer

101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Migrating data or applications for cloud computing can involve converting physical servers to virtual servers, for example, without changing the applications or replacing database servers with cloud versions. The ability to reduce carbon in such migrations can be limited by power usage effectiveness of cloud datacenter and efficient hardware.

In some embodiments, systems, methods, and techniques are presented that can provide energy efficient migration of applications, e.g., energy efficient cloud transformation path for cloud migration. In some embodiments, systems, methods, and techniques, in planning an application migration for cloud computing and/or application modernization, identify appropriate application refactoring or cloud journey patterns that promote energy efficiency. For example, systems, methods, and techniques factor in specific cloud journey such as Lift-And-Shift/Rehosting, Re-platform, Replace, Re-Architect, Retire and Retain, in deciding cloud migration.

In some embodiment, a system and/or method dynamically determines a migration design that yields highest energy savings. In some embodiments, a system and/or method dynamically determines application or solution migration patterns in transformation initiatives with optimal energy consumption. In some embodiments, a system and/or method performs futuristic projection of energy consumption based on current pattern of consumption of resources, and dynamically determines cloud migration patterns that yield maximum energy savings. In some embodiments, a system and/or method recommends an automated energy optimization for any transformation initiative by a dynamic factoring of resource utilization metrics. In some embodiments, a system and/or method determines right energy aware design based on existing application usage data and design pattern to ensure right energy efficient framework being chosen based on workload characteristics. In some embodiments, a system and/or method determines energy saving metrics derived from historical behavior and migration results. In some embodiments, a system and/or method verifies reasoned decision of a migration strategy choice by calculating the cost of energy savings and comparing it to the cost of transformation.

Figure 2:
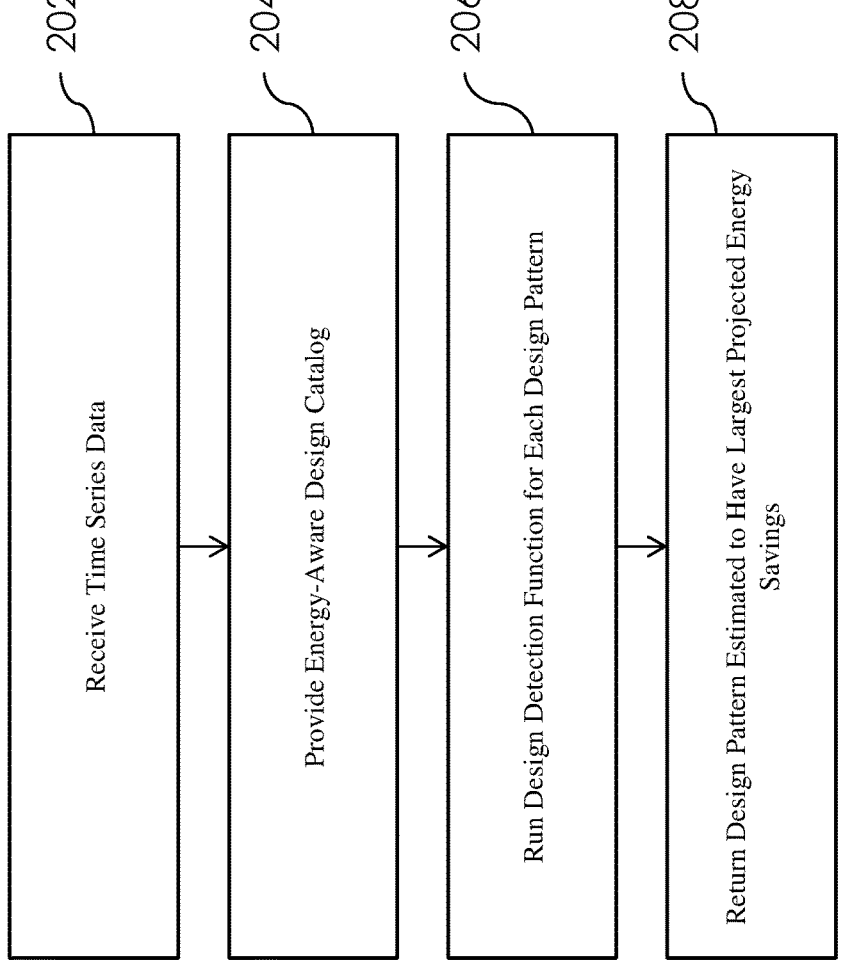
FIG. 2 is a diagram illustrating a method of determining application migration recommendation based on energy consumption in some embodiments.

FIG. 2 is a diagram illustrating a method of determining application migration recommendation based on energy consumption in some embodiments. For example, the method determines which transformation for an application provides best energy efficiency, for example, least energy consumption, also may provide an estimate of energy savings if the application is so transformed according to the determination. One or more computer processors or hardware processors, e.g., described with reference to the computing environment in FIG. 1 can perform the method.

At 202, the method includes receiving time series data of application energy consumption and application usage metrics associated with an application being considered for migration in a computing environment. For example, the method may capture or receive time series data for an application under consideration. Time series data includes data related to application energy consumption for a period of time, e.g., N months, where N is configurable. For example, the period of time or the duration of time for which the time series data is captured or received can be configured or predefined. Time series data also includes data related to application usage metrics life such as, but not limited to, one or more combinations of: number of application programming interface (API) calls, number of database transactions, network bytes that are transferred, central processing unit (CPU) and memory usage, number of messages processed, number of transaction failure logs, disk space usage, and batch schedule time. Such information received as input can be obtained from historical data and are available or pre-existing.

At 204, the method includes providing an energy aware design catalog having a list of design patterns for migration and associated design detection functions. For reference data, energy aware design catalog (e.g., PC) is provided, which includes names of design patterns (e.g., also referred to as pattern names) and design detection function $P_{df}$. Design detection function Par returns a true or false, and a projected energy savings. Examples of patterns or design patterns include, but are not limited to, API-to-cloud function, monolithic to microservices (mono-to-micro). Briefly, a monolithic application or monolithic application architecture refers to an application built as a single unified unit while a microservices architecture includes a collection of smaller, independent services. In API-to-cloud function, an API is migrated as a cloud function in a cloud computing environment. For instance, API-to-cloud function design pattern transforms an application from an API to a function in a cloud computing environment. In mono-to-micro design pattern a single deployable unit (e.g., single application) is migrated as a front-end service only with no back-end services being incorporated. For instance, a mono-to-micro design pattern transforms an application to a microservice. In mono-to-micro design, scaling of sub-functions is possible. Design patterns can provide for appropriate sizing of resources and avoid running batches at the same time. A design pattern is also referred to as a journey, e.g., a migration journey.

At 206, the method includes, for each of the design patterns listed in the energy aware design catalog, running a design detection function associated with a design pattern using the time series data of application energy consumption and application usage metrics, where the design detection function outputs whether the application is suitable for transformation using the design pattern and projected energy savings if the transformation is implemented using the design pattern.

At 208, the method includes returning a design pattern estimated to have largest projected energy savings as recommended migration for the application.

For example, using the reference data, the following processing is performed. A variable holding maximum energy is initialized to zero and a variable holding pattern name is set to empty string. E.g., set maximum energy (e.g., $E_{max}$) to zero and pattern name (e.g., PNAME) to empty string as follows: set $E_{max}=0$ and PNAME=" ".

For each element P (e.g., design pattern name) in energy aware design catalog (e.g., PC), run the reference data's design detection function $P_{df}$ associated with that element P. For example, for each element P, capture: isOK, $E_p=P_{df}$ (Input); If isOK is true and $E_{max}<E_p$, then set $E_{max}=E_p$, PNAME=pattern name of P.

Return PNAME as most energy efficient design and Emax as projected saving.

In some embodiments, energy bill savings can be calculated and compared to cost of transformation (e.g., migration) to define return on investment (ROI).

In some embodiments, the energy aware design catalog can include the following pattern names and associated design detection function $P_{df}$: API-to-cloud function, monolithic to microservices. Other pattern names and associated design detection function can be built or provided.

By way of example, design detection function $P_{df}$ associated with API-to-cloud function operates as follows. Input to the design detection function for API-to-cloud function includes a time series of number of API calls for the application component or application. The duration of the time series data can be predefined or configured. For example, for monolithic applications, the duration can be set to at least n weeks, where n is configurable. Input to the design detection function also includes time series of CPU utilization for the application component or application.

Predefined constants and functions includes: n, which represents a time duration of the time series, e.g., n can represent number of weeks of time series; Power model function, P(u), that gives the energy consumed for CPU utilization value u; CPU utilization threshold $T_{CPU-Min}$; Savings threshold percentage $T_{saving \%}$. This savings threshold percentage is a number between 1 to 100. Output of the design detection function for API-to-cloud function includes true or false value. E.g., if the application under consideration is suitable to be migrated as cloud function, the output value returned would be true, otherwise false.

Output of the design detection function for API-to-cloud function also include approximate energy savings per time period, e.g., energy savings per month.

In some embodiments, processing shown in Algorithm 1 is performed by the design detection function for API-to-cloud function journey or migration pattern.

---

Algorithm 1

1. From the input API call timeseries, define set $S_0$ that includes time intervals $\{t_0, t_1, t_2 ..., t_k\}$ where number of API calls are zero. /* From the input time series of transaction counts, this step identifies the time intervals when number of (alternatively average number of) transactions are equal to zero. Since transaction count is a positive number, average transaction number being equal to zero leads to actual number of transactions as zero. This step allows to identify usage pattern of a transaction. If the transaction is used during a significant amount of time interval, then it is a potential candidate for migration to a cloud function */

2. If size of $S_0$ is 0 then exit the processing. /* Size of set $S_0$ refers to the number of elements present in the set $S_0$. If the size of set $S_0$ is 0, it is an indication that this transaction is used continuously over a period of time. */ $S_0$ with size 0 implies that this application cannot be transformed to a cloud function. In this case, return {False, 0 } as output.

3. For each time interval $t_j$ of $S_0$, find the average CPU utilization from CPU utilization timeseries in that interval $t_j$ and store them in set U = $\{u_0, u_1, ..., u_k\}$ where $u_k$ represents utilization at interval $t_k$.

4. Define E as projected energy saving and set E=0.

5. Define TE as total idle energy and set TE=0.

6. For each of element $u_i$ of set U,
    a. If the value of $u_i > T_{CPU-Min}$ then set E=E+ P($u_i$)
    b. Set TE = TE+ P($u_i$)

-continued

| Algorithm 1 |
| --- |
| 7.    If E/TE*100 > $T_{saving\%}$, then return<br>       a. {True , (E-TE)*400/(TE*n) } [* Total energy saving over a period of n weeks ,<br>         converted to projected savings for 4 weeks(1 month) ]<br>       Else return {False, 0} |

In some embodiments, serverless architecture works as event driven. For example, in response to an occurrence of an event, a resource being provisioned is computed to take an action on the event. After the action is taken or accomplished, servers and associated ephemeral memory and storage are destroyed or removed. Thus, resources are used when there is an event or activity to be performed.

The number of transactions being zero indicates that an application is not being used during that particular time. Although for Virtual Machine (VM)-based architecture, a computing environment still draws energy as a server is running even though not doing anything (referred to as static energy). Identifying time intervals in which transactions are zero, identifies the time or duration of time during which the computing environment is drawing static energy without performing application specific operations.

If this application were to be moved to a serverless platform, there can be savings in those static energy, e.g., since after successful completion of a task, allocated resources in serverless platform will be destroyed or removed. Hence, in such an environment, the computing environment would not be consuming static energy when there is no incoming load.

Figure 4:
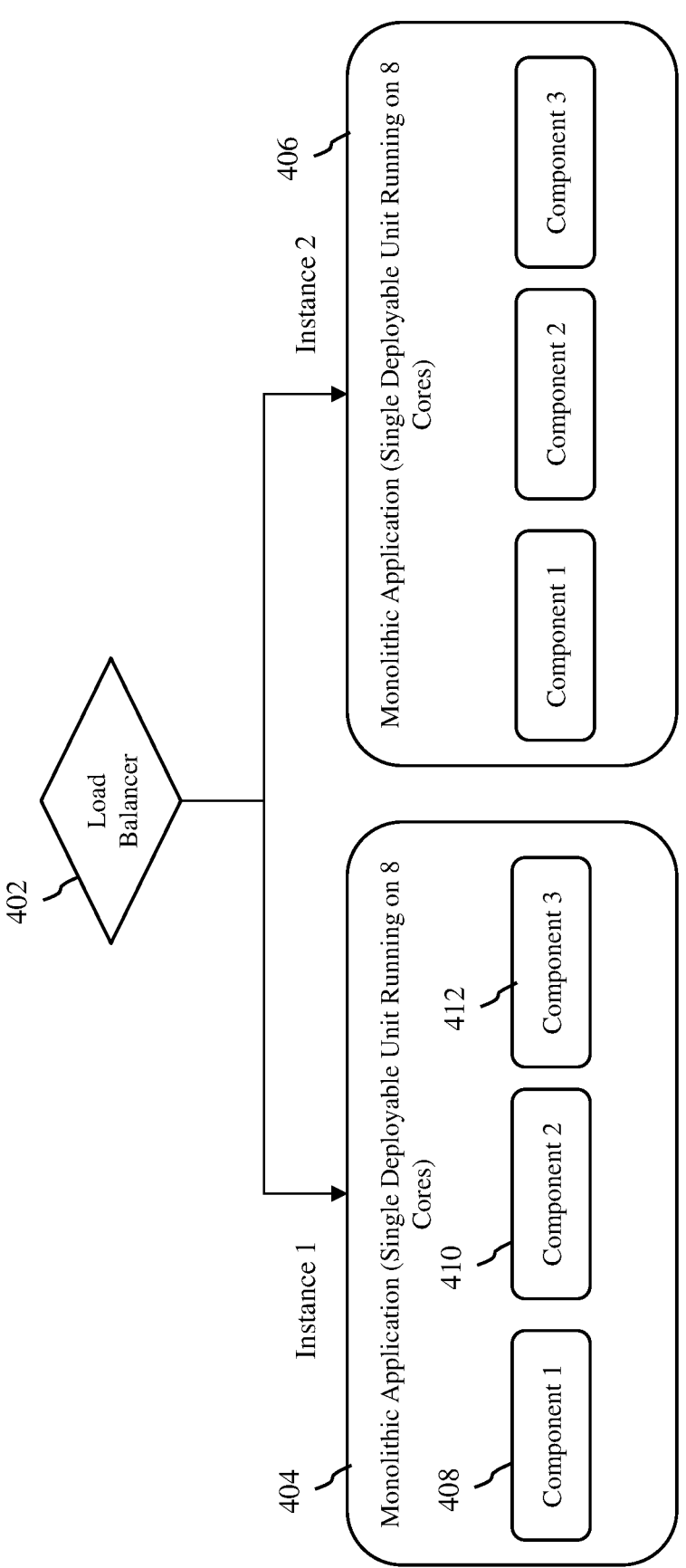
FIG. 4 shows horizontal autoscaling of virtual machine (VM) based on CPU utilization metric of VM due to spike in network traffic in some embodiments.
Figure 5:
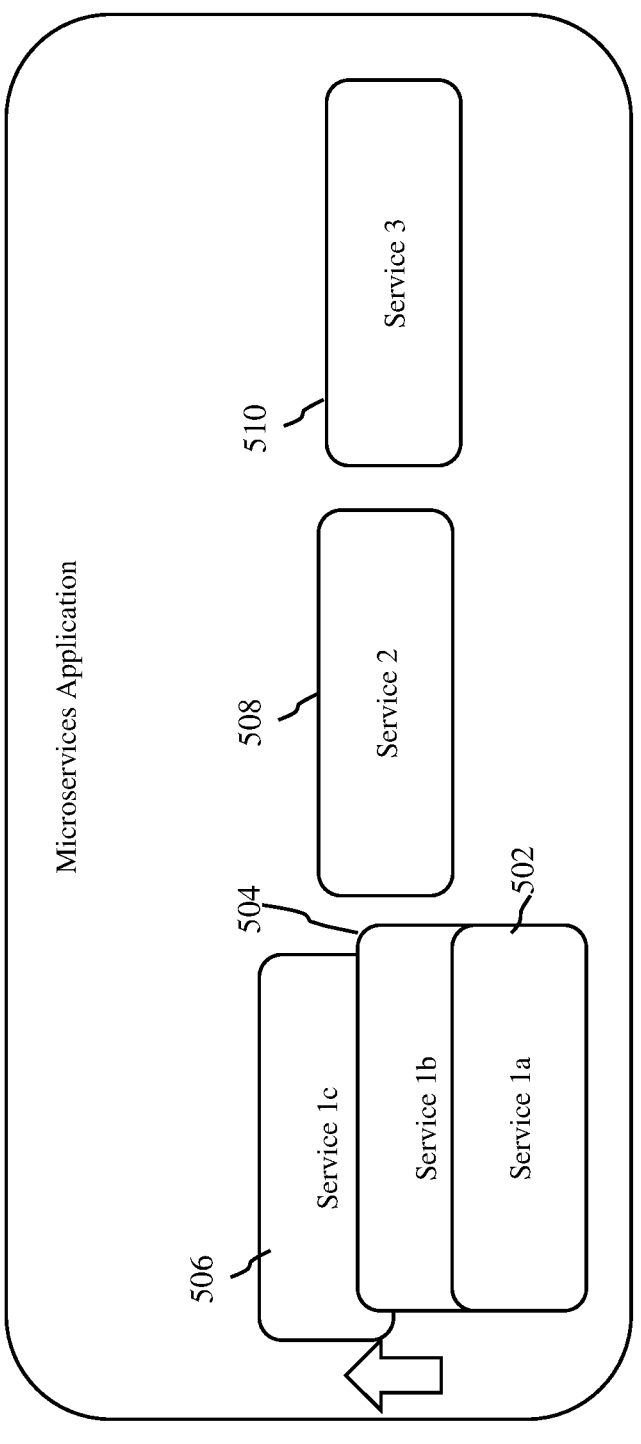
FIG. 5 shows autoscaling of pod based on pod CPU utilization metrics due to spike in network traffic in some embodiments.

By way of another example, design detection function $P_{df}$ associated with monolithic to microservices migration pattern operates as follows. Scenarios for monolithic to microservices migration pattern can include static load and dynamic load. If load is static throughout the time interval, then calculating $T_{saving\%}$ from monolithic to microservices would not be sufficient and monolithic platform cloud may be more energy efficient. For example, in a scenario where a workload with network traffic maintains a steady utilization $U_s$, $TE_{Mono}$ (energy consumed by a monolithic application) would be $TE_{Mono}=P(U_s)$, such energy consumption being maintained over all of the period. During a move (migration) to microservices, there can be several inter service communications that can happen, where a management layer runs on top of the microservices. In such a scenario, energy consumed by future microservice application would be $TE_{Micro}=P(U_s)+\mu P$(Energy Consumed by Network)+$\beta P$(Energy Consumed by Management Layer), where $\mu$ and $\beta$ are configurable parameters. So for steady or static workload with little or no variance of incoming traffic volume, $TE_{Micro}>TE_{Mono}$. In a different scenario where there is a variant traffic, e.g., like seasonal sales in retail websites, the amount of activity on such websites could be much higher than actual underlying (e.g., financial) transactions. If an application is built on monolithic architecture, one would need to scale the entire application irrespective of which services are being highly used compared to others. FIG. 4 illustrates this scenario in some embodiments. In such scenario, by way of example, user interface (UI) services within microservice workload could scale higher, but backend services could maintain a limited capacity to maintain application continuity, and therefore savings in energy consumption can be realized. In such scenario, $TE_{Micro}=P(U_i)+$ $P(B_i)+\mu P$(Energy Consumed by Network)+$\beta P$(Energy Consumed by Management Layer), where represents $U_i$ user interface and $B_i$ represents backend service. This $P(U_i)+P$ $(B_i)$ is much lower than $TE_{Mono}$. If one considers that a monolithic application runs on 8 Core CPU, where both UI and Backend services are in same deployment package, and if the application were to be converted to microservices (considering 2 services for easy illustrations), there would be UI services with 4 Cores and Backend Services as 4 Cores running independently. By way of example, considering an occurrence of a sudden spike on utilization, $TE_{Mono}$ is equivalent to energy consumed by 8 Cores at 80% utilization while $TE_{Micro}$ is equivalent to energy consumed by 4 Cores at 80% Utilization+4 Cores at 20% utilization. In such scenario, $TE_{Micro}<TE_{Mono}$. Hence, migrating an application from monolithic application architecture to microservices where there is variations in the application load (e.g., dynamic load), savings in energy consumption can be realized. FIG. 5 illustrates such an example scenario in some embodiments, where a monolithic application can be migrated to microservices.

Inputs to the design detection function for monolithic to microservices migration includes: Timeseries of number of transactions for application component or application (if monolith) for a time period, for example, at least n weeks, where n is configurable; Timeseries of CPU utilization for the application component or application.

Predefined constants and functions for the design detection function for monolithic to microservices migration includes: n, where n represents a number of weeks of timeseries; Power model function, P(u), that gives the energy consumed for CPU utilization value U; CPU utilization threshold $T_{CPU-Min}$; Savings threshold percentage $T_{saving\%}$. Savings threshold percentage $T_{saving\%}$ is a number between 1 and 100, including 1 and 100.

Outputs to the design detection function for monolithic to microservices migration includes: True/false (e.g., if this application under consideration is suitable for redesigning (or migrating) as microservices, a value that represents True is returned; otherwise a value that represents False is returned); approximate or estimated energy savings per period (e.g., per month) and calculated energy bill savings based on demographic per unit cost.

Figure 3:
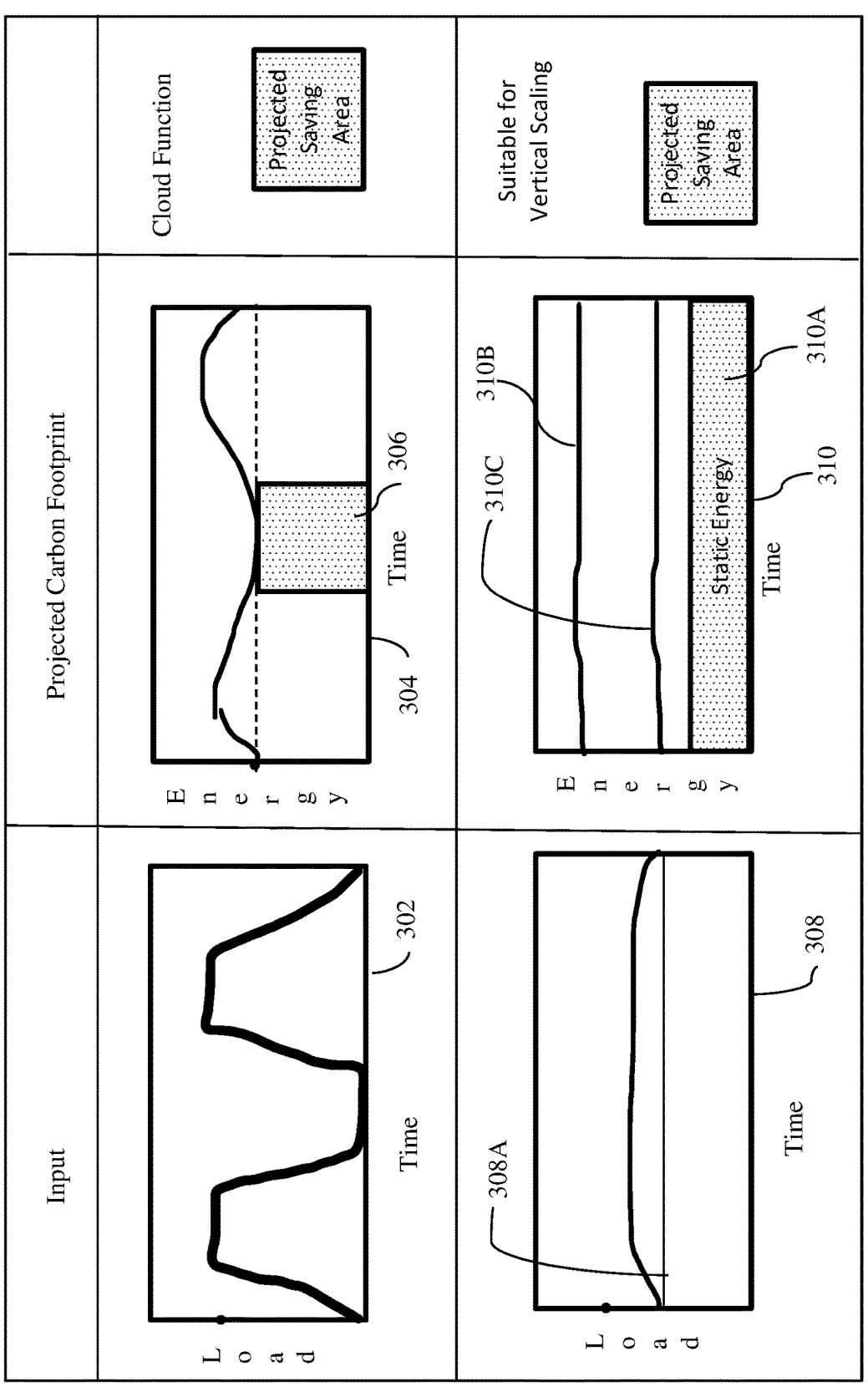
FIG. 3 shows a visual representations of application migration recommendation based on energy consumption in some embodiments.

In some embodiments, a method of determining application migration based on energy consumption includes providing a visual representation of an application load and energy consumption with potential energy saving. A user interface or like dashboard can be provided that present such visualization. For example, FIG. 3 shows a visual representations of application migration recommendation based on energy consumption in some embodiments. An example application load is shown graphically at 302. This example application load shows a sinusoidal pattern or behavior where the load increases and decreases over time and reduces to zero sometime (e.g., not necessarily at a regular interval). A corresponding energy consumption represented graphically at 304 (e.g., projected carbon footprint) for this application load shows that even at zero load, there is energy consumption (hence there is a carbon emission). Using a cloud function migration pattern or journey for an application with this type of application load pattern is expected to save energy. The amount of energy savings that could possibly be achieved after migrating to cloud function, is equivalent to the area shown at 306. This is so, since in cloud computing, an application implemented as cloud function with zero load may not consume energy. Referring to a graphical representation of an application load shown at 308, where load is consistently high and the load crosses threshold of horizontal scaling (shown by line 308A) and creates new application instance to handle such load. Total energy consumption (e.g., projected carbon footprint) for this type of load with 2 application instances is graphically represented at 310, where 310B line shows energy consumed by first application instance, 310C line shows energy consumed by second application instance. An application having this type of application load pattern may be suitable for vertical scaling. In this kind of scenarios, instead of creating a new instance of application to handle the load, increasing the capacity (adding more CPU/RAM/Disk) of the application hosting environment may lead to more energy savings than spawning two application instances. This way, the static energy consumed by the new application instance can be saved. The amount of energy savings in this type of case is equivalent to the area shown at 310A. The technique of allocating more resources, e.g., CPU, RAM, Disk, to existing application instance is known as "vertical scaling".

FIG. 4 shows horizontal autoscaling of virtual machine (VM) based on CPU utilization metric of VM due to spike in network traffic in some embodiments. For example, if there is an increase in traffic hitting 80% utilization on both of two instances 404, 406 of monolithic application, each with a single deployable unit running on 8 Cores, load balancer 402 may scale out another two instances on different availability zone, each of those two instances having 8 Cores, even if traffic of Component 1 (shown at 408) increased but transactions on Component 2 (shown at 410) and Component 3 (shown at 412) remain the same. In such a case there can be 8*4=32 Cores of total CPU capacity.

FIG. 5 shows autoscaling of pod based on pod CPU utilization metrics due to spike in network traffic in some embodiments. For instance, if there is an increase in traffic on Service 1, which is a microservices decomposition of Component 1 (FIG. 4, 408) of monolithic application shown in FIG. 4, that service can be scaled out independently (e.g., as shown at 502, 504, 506), while Service 2 (shown at 508) and Service 3 (shown at 510) keep running on its original capacity.

Figure 6:
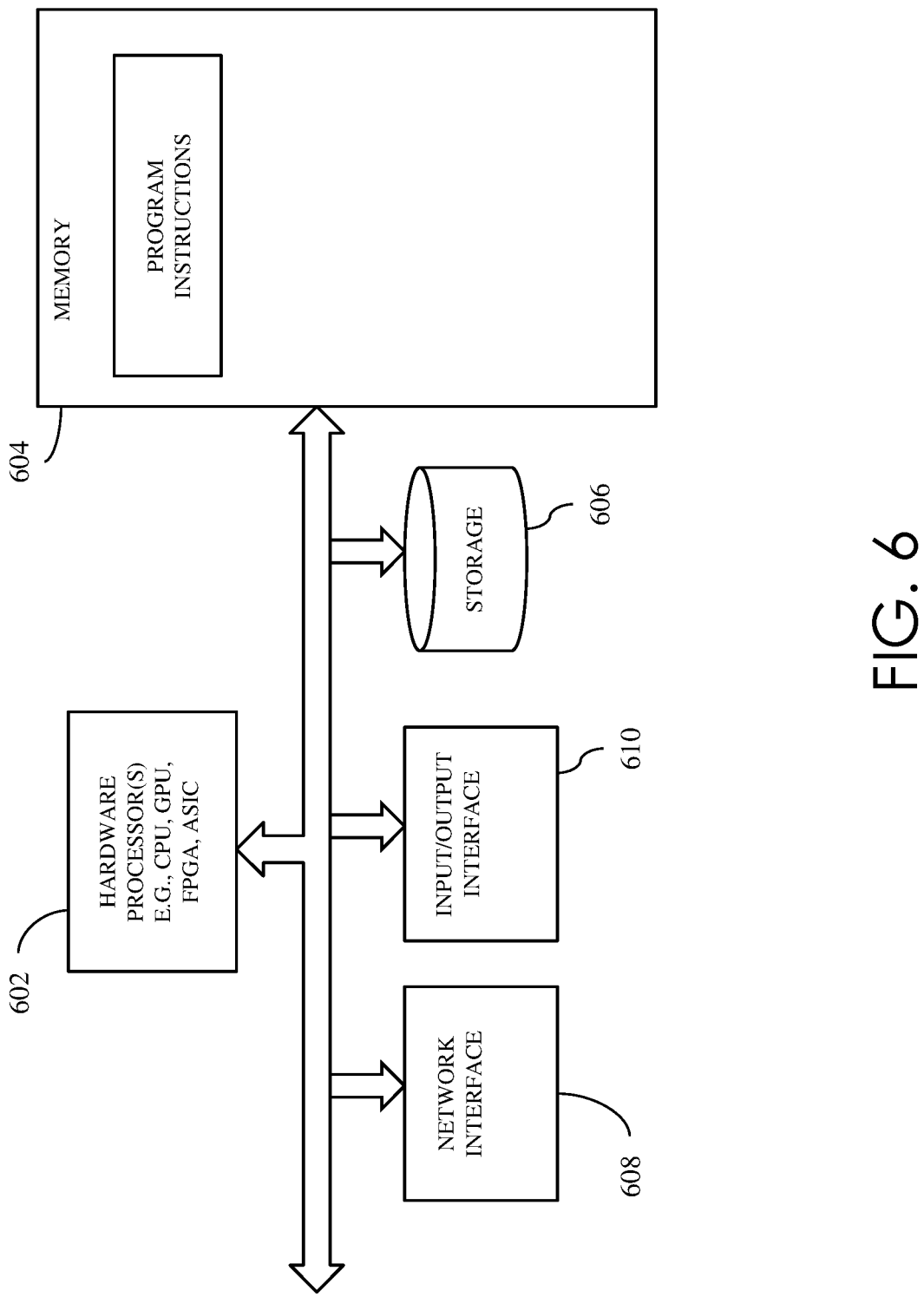
FIG. 6 is a diagram showing components of a system in some embodiments that determines application migration recommendation based on energy consumption.

FIG. 6 is a diagram showing components of a system in some embodiments that determines application migration recommendation based on energy consumption. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and perform energy-aware application migration recommendation. A memory device 604 may include random access memory (RAM), read-only memory (ROM) or another memory device, and may store data and/or processor instructions for implementing various functionalities associated with the methods and/or systems described herein. One or more processors 602 may execute computer instructions stored in memory 604 or received from another computer device or medium. A memory device 604 may, for example, store instructions and/or data for functioning of one or more hardware processors 602, and may include an operating system and other program of instructions and/or data. One or more hardware processors 602 may receive input that includes time series data of application energy consumption and application usage metrics associated with an application being considered for migration in a computing environment, for example, such as one shown with reference to FIG. 1. One or more hardware processors 602 may provide an energy aware design catalog having a list of design patterns for migration and associated design detection functions. One or more hardware processors 602 may, for each of the design patterns listed in the energy aware design catalog, run a design detection function associated with a design pattern using the time series data of application energy consumption and application usage metrics, where the design detection function outputs whether the application is suitable for transformation using the design pattern and projected energy savings gained if the transformation is implemented using the design pattern. One or more hardware processors 602 may return a design pattern estimated to have largest projected energy savings as recommended migration for the application. The data used by one or more hardware processors 602 may be stored in a storage device 606 or received via a network interface 608 from a remote device, and may be temporarily loaded into a memory device 604 for determining application migration recommendation. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in some embodiments" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   receiving time series data of application energy consumption and application usage metrics associated with an application being considered for migration in a computing environment;
   providing an energy aware design catalog having a list of design patterns for migration and associated design detection functions, the list of design patterns including at least an application programming interface (API)-to-cloud function design pattern for transforming the application from an API to a function in a cloud computing environment and a monolithic-to-microservice design pattern for transforming the application to a microservice;
   for each of the design patterns listed in the energy aware design catalog,
      running a design detection function associated with a design pattern using the time series data of application energy consumption and application usage metrics, wherein the design detection function outputs whether the application is applicable for transformation using the design pattern based on determining whether the application is drawing static energy;
      returning a design pattern estimated to have largest projected energy savings as recommended migration for the application; and
      based on a recommended design pattern, balancing application load associated with the application in the computing environment.

2. The computer-implemented method of claim 1, wherein the application usage metrics includes at least a central processing unit (CPU) utilization of the application.

3. The computer-implemented method of claim 1, wherein the application usage metrics includes at least a number of API calls performed in the application.

4. The computer-implemented method of claim 1, wherein the application usage metrics includes at least a number of database transactions performed in the application.

5. The computer-implemented method of claim 1, further including providing a visual representation of an application load and energy consumption with potential energy savings.

6. A computer program product comprising a computer readable storage medium having program instructions embodied therewith, the program instructions readable by a device to cause the device to:
   receive time series data of application energy consumption and application usage metrics associated with an application being considered for migration in a computing environment;
   provide an energy aware design catalog having a list of design patterns for migration and associated design detection functions, the list of design patterns including at least an application programming interface (API)-to-cloud function design pattern for transforming the application from an API to a function in a cloud computing environment and a monolithic-to-microservice design pattern for transforming the application to a microservice;
   for each of the design patterns listed in the energy aware design catalog, run a design detection function associated with a design pattern using the time series data of application energy consumption and application usage metrics, wherein the design detection function outputs whether the application is applicable for transformation using the design pattern based on determining whether the application is drawing static energy;
   return a design pattern estimated to have largest projected energy savings as recommended migration for the application; and
   based on a recommended design pattern, balance application load associated with the application in the computing environment.

7. The computer program product of claim 6, wherein the application usage metrics includes at least a central processing unit (CPU) utilization of the application.

8. The computer program product of claim 6, wherein the application usage metrics includes at least a number of API calls performed in the application.

9. The computer program product of claim 6, wherein the application usage metrics includes at least a number of database transactions performed in the application.

10. The computer program product of claim 6, wherein the device is further caused to provide a visual representation of an application load and energy consumption with potential energy savings.

11. A system comprising:
   at least one computer processor;
   at least one memory device coupled with the at least one computer processor;
   the at least one computer processor configured to at least:
      receive time series data of application energy consumption and application usage metrics associated with an application being considered for migration in a computing environment;
      provide an energy aware design catalog having a list of design patterns for migration and associated design detection functions, the list of design patterns including at least an application programming interface (API)-to-cloud function design pattern for transforming the application from an API to a function in a cloud computing environment and a monolithic-to-microservice design pattern for transforming the application to a microservice;
      for each of the design patterns listed in the energy aware design catalog,
         run a design detection function associated with a design pattern using the time series data of application energy consumption and application usage metrics, wherein the design detection function outputs whether the application is applicable for transformation using the design pattern based on determining whether the application is drawing static energy;
         return a design pattern estimated to have largest projected energy savings as recommended migration for the application; and
         based on a recommended design pattern, balance application load associated with the application in the computing environment.

12. The system of claim 11, wherein the application usage metrics includes at least a central processing unit (CPU) utilization of the application.

13. The system of claim 11, wherein the application usage metrics includes at least a number of API calls performed in the application.

14. The system of claim 11, wherein the application usage metrics includes at least a number of database transactions performed in the application.

* * * * *